United States Patent [19]

Synder et al.

[11] 4,213,400
[45] Jul. 22, 1980

[54] RESILIENT RAILWAY BODY CENTER PLATE

[75] Inventors: Richard C. Synder, Michigan City; Roger D. Sims; George L. Rousseau, both of Munster, all of Ind.

[73] Assignee: Pullman Incorporated, Chicago, Ill.

[21] Appl. No.: 900,700

[22] Filed: Apr. 28, 1978

[51] Int. Cl.² ............ B61F 5/20; F16C 17/04; F16C 27/08; F16F 1/44
[52] U.S. Cl. .................. 105/199 C; 105/189; 308/137
[58] Field of Search .......... 105/199 C, 18 ZR, 199 C, 105/199 F, 224.1, 189; 308/137

[56] References Cited
U.S. PATENT DOCUMENTS

| | | | |
|---|---|---|---|
| 1,928,740 | 10/1933 | Tatum | 308/137 X |
| 2,258,640 | 10/1941 | Beckette | 308/137 |
| 2,509,955 | 5/1950 | Barnes | 105/199 C |
| 2,655,117 | 10/1953 | Travilla | 308/137 X |
| 3,218,989 | 11/1965 | Kreiner et al. | 105/200 |
| 3,405,654 | 10/1968 | Dilg | 105/199 C X |
| 3,523,505 | 8/1970 | Lich | 105/18 ZR |
| 3,650,220 | 3/1972 | Lich | 105/199 F |
| 3,667,820 | 6/1972 | Sherrick | 105/199 C X |
| 3,720,175 | 3/1973 | Russell-French | 105/224.1 |
| 3,986,752 | 10/1976 | Bogar et al. | 105/199 C |

*Primary Examiner*—Howard Beltran
*Attorney, Agent, or Firm*—Richard J. Myers

[57] ABSTRACT

A load distributing and vibration damping center bearing assembly for a railway car including a body center plate assembly including a base plate secured to the body bolster, a flat truck bowl bearing plate, and an elastomeric disc sandwiched therebetween and bonded between the brass plate and bearing plate to abate and dissipate destructive radial and vertical impact loading on the truck bowl and center plate during rail operations.

10 Claims, 5 Drawing Figures

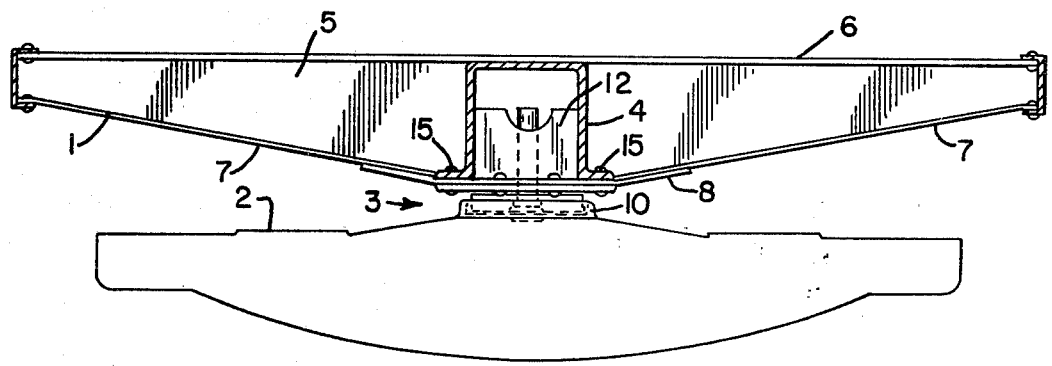
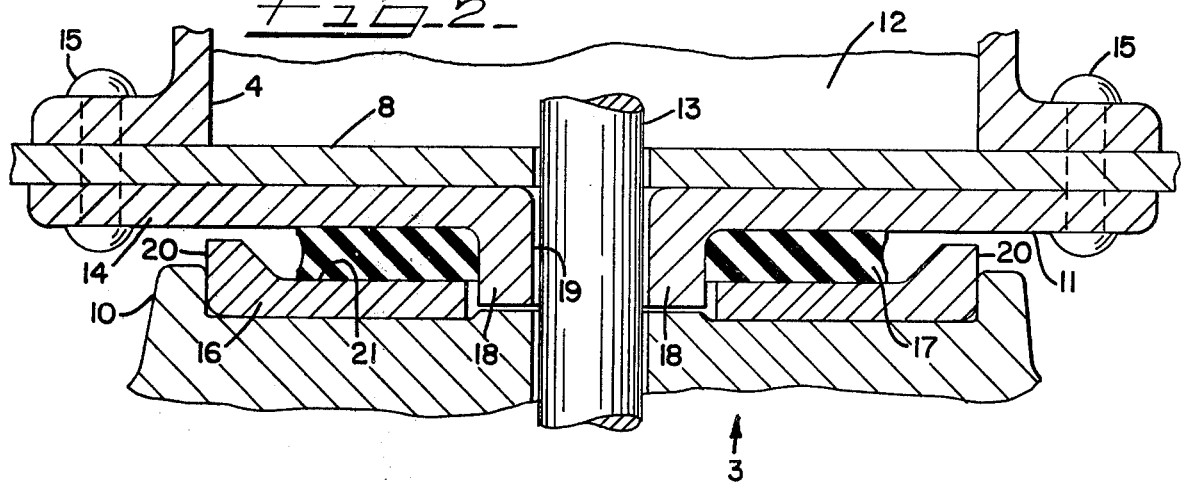
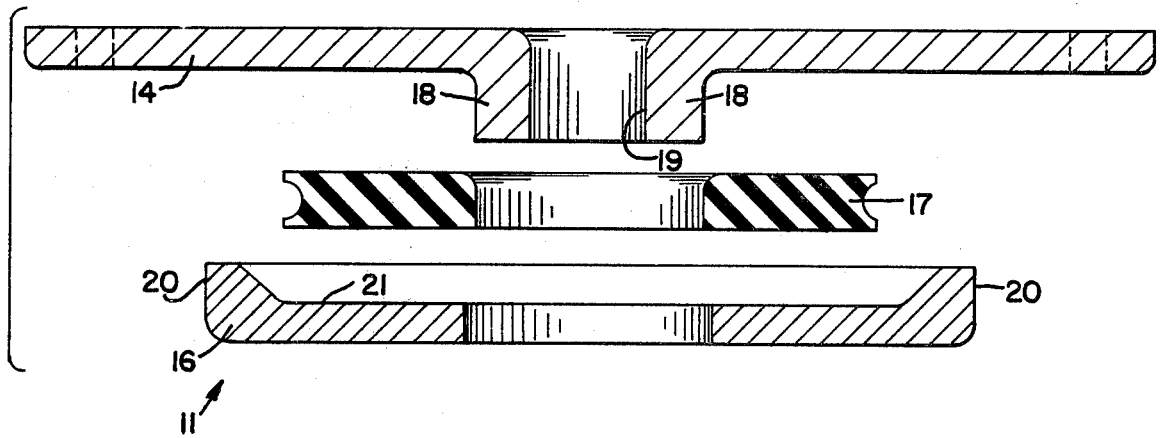

RESILIENT RAILWAY BODY CENTER PLATE

BACKGROUND OF THE INVENTION

1. Field of the Invention

The present invention relates to the underframe of a railway car and more particualrly to a load distributing and vibration damping center bearing assembly interposed between the underframe and the trucks.

2. Description of the Prior Art

The prior art is exemplified by U.S. Pat. Nos. 3,405,654 and 3,667,820 which show center bearing assemblies having resilient liners interposed between their respective car body center plates and truck bowls. Attention is also directed to U.S. Pat. No. 3,218,989 which shows a center bearing assembly having a liner to prevent wear between its body center plate and truck bowl.

SUMMARY OF THE INVENTION

The present invention relates to a load distributing and vibration damping center bearing assembly for a railway vehicle including a car body bolster and a supporting wheel truck having a transverse truck bolster. The center bearing assembly includes an upwardly opening bowl supported on the truck bolster and a body center plate assembly carried within the bowl and adapted to support the car body bolster. The body center plate assembly includes a base plate secured to the underside of the car body bolster, a center bearing plate mating with the truck bowl, and an elastomeric cushion interposed between the base and bearing plate and bonded thereto as well as radial and vertical stop means to arrest extreme relative movement between the base and bearing plates.

BRIEF DESCRIPTION OF THE DRAWINGS

FIG. 1 is an end elevation view of a railway car underframe having the center bearing assembly in accordance with and embodying the present invention;

FIG. 2 is a fragmentary sectional elevation taken through the center of the center bearing assembly;

FIG. 3 is an exploded view of the sectional elevation shown in FIG. 2;

FIG. 4 is the same as FIG. 2 but showing the relationship between the car body bolster and the truck bowl when the bolster is tilted to its extreme position due to truck hunting or the like.

DESCRIPTION OF THE PREFERRED EMBODIMENT

Figure 4:
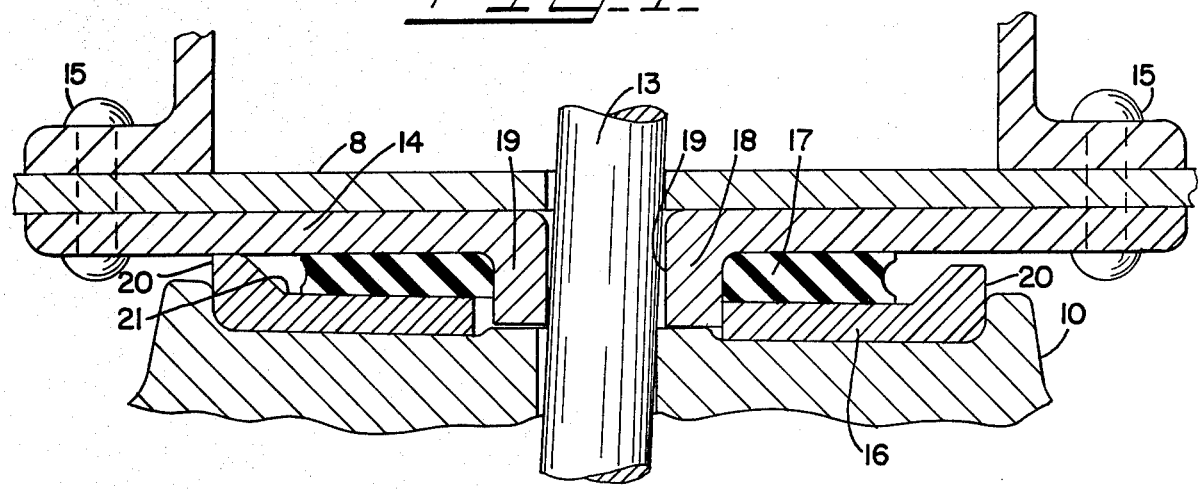
Figure 5:
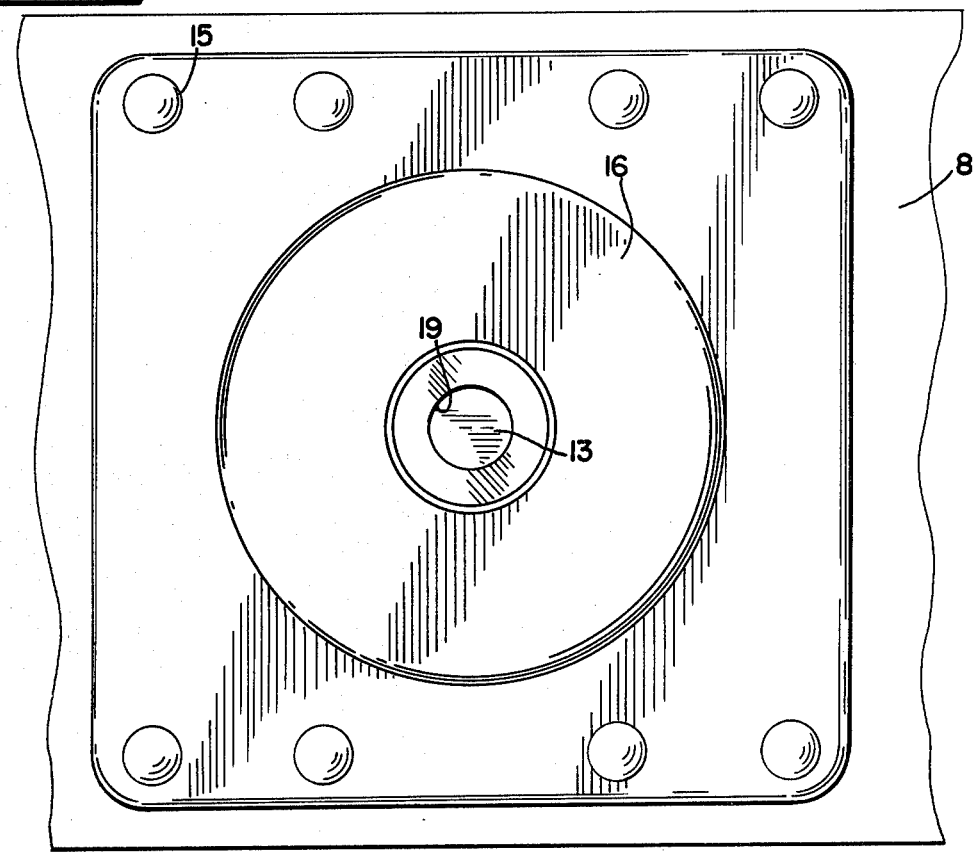
FIG. 5 is a bottom view of the body center plate assembly.

Referring to the drawings and particularly FIG. 1, there shown is a car body bolster 1 pivotally supported on a truck bolster beam 2 through the center bearing assembly 3 of the present invention. As thus positioned, the center bearing assembly 3 receives and transfers vertically directed loads from the car body to the car truck as well as lateral and longitudinal forces resulting from rocking of the car due to truck hunting, coupler impact or the like during rail use of the car.

The general vehicle construction provides that the car body include a longitudinally extending center sill 4 hat-shaped in cross section and a transversely extending car body bolster beam 1 above each truck. Each body bolster beam 1 is of a closed box beam construction and includes vertically extending bolster webs 5, upper and lower connecting cover plates 6 and 7, and stress or wear plate 8. The truck bolster beam 2 extends transversely of the vehicle and is vertically spaced beneath the associated body bolster beam 1. The outer ends of the truck bolsters 2 are supported on respective truck side frames (not shown) which in turn are carried by the car wheel axles.

The center bearing assembly contemplated by the present invention includes an upwardly opening bowl 10 supported on the truck bolster 2 and a body center plate assembly 11 carried within the bowl 10 and adapted to support the car body bolster 1 through the conventional center filler 12 and stress or wear plate 8, and a conventional center pin 13 extending vertically through the body center plate assembly 11 and the bowl 10 which maintains vertical alignment of the center plate assembly 11 within the bowl 10 when the car is moved over rough track or subjected to coupler impacts during train marshalling operations or the like.

The body center plate assembly 11 includes a base plate 14 secured to the stress plate 8 on the underside of the body bolster 1 by bolts or rivets 15 as generally indicated in FIG. 1, a cylindrical bearing plate 16 matingly carried within the bowl 10, and an elastomeric cushion 17 interposed between the base and bearing plate 14 and 16 and bonded thereto by heat bonding or other well known means. The elastomeric cushion 17 may be made of hard rubber, a thermoplastic or similar material. Thus, because of the energy absorbing character of such materials; sever radial and vertical impact loads in the center bearing assembly 3 which otherwise would result from car body rocking, bouncing, or the like, are effectively damped or absorbed by the cushion as well as distributed over a greater area of the bearing plate 16 and truck bowl 10 due to the resiliency of the material. Similarly, because the cushion 17 is bonded to both the base and bearing plates 14 and 16, radical or jerking-like swiveling movement of the trucks caused by truck hunting is damped by the cushion, thereby enhancing the stability of the car during high speed operations.

The structure of the invention also provides for limiting the magnitude of relative radial and vertical movement between the base plate 14 and bearing plate 16. As illustrated in FIG. 4, the base plate 14 includes a depending annular flange portion 18 about the periphery of the aperture 19 provided for the pin 13, and an upstanding annular flange 20 portion about the periphery of the bearing plate 16 arranged such that when the car body is subjected to extreme rocking conditions, the depending flange portion 18 and the upstanding flange portion 20 will abutably engage the pin 13 and base plate 14 to limit relative movement between the base and bearing plates 14 and 16. By this construction, the invention protects the cushion from extreme radial and vertical loading which could tear or otherwise obviate the resilient properties of the cushion. Additionally it should also be noted that since the cushion 17 is disposed substantially within the recessed portion 21 of the bearing plate 16 defined by the upstanding annular flange 20, the car body center plate assembly 11 can be installed and used without any modification of the car body underframe structure which otherwise would be required to attain proper vertical clearance of the car body structure established by AAR guidelines (e.g., coupler height, etc.).

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a railway freight car having a truck bolster with a center bearing bowl including an upwardly generally horizontal bearing portion for supporting the car body center plate of the car body bolster and an upwardly extending peripheral flange portion, an improved car body center plate structure adapted to support a body bolster comprising:

a car body base member supporting the body bolster, said base member having a laterally outward portion having a depending undersurface and a central annular flange portion extending below the outward portion toward the area of the truck bowl, an annular wear member vertically aligned beneath said base member, said annular wear member having a top surface and a bottom truck bowl bearing surface which mates with the horizontal bearing portion and peripheral flange portion of the truck bowl to permit relative pivotal movement between said wear plate and said truck bowl while preventing lateral movement of said truck bowl relative to said wear plate; and an annular elastomeric cushion disc vertically aligned between said base and wear member and having an upper surface bonded to said undersurface of the base member and a bottom surface bonded to the top surface of the wear member and being disposed about the periphery of said annular flange portion; whereby, vertically directed forces through the truck bowl and improved body center plate structure during rail operations are substantially dissipated by vertical reactive compression of said elastomeric disc between said vertically spaced base and wear members and swiveling movement of the truck caused by truck hunting is minimized.

2. The invention according to claim 1, and
said annular wear member including an upstanding peripheral flange portion having an upper surface vertically spaced a predetermined distance from said base member and abutably engageable thereagainst.

3. The invention according to claim 1, and
said elastomeric disc having a concave groove about its outer periphery.

4. The invention according to claim 1, and
said annular flange portion having a lower surface vertically spaced a predetermined distance above the bearing surface of the truck bowl to accommodate tilting therewithin of the base member within the resilient limit of said elastomeric disc.

5. The invention according to claim 1, and
a vertical center bearing pin extending through said annular flange portion and truck bowl, thereby arresting predetermined radial relative movement therebetween.

6. The invention according to claim 1, and
said annular wear member having an apertured portion receiving said annular flange portion,
said apertured portion having an aperture receiving the flange portion of greater diameter than said flange portion, to accommodate limited shifting movement of said annular flange portion therewithin.

7. The invention according to claim 6, and
said central annular flange portion having its outer vertical surface engaging the inner vertical periphery of the annular disc.

8. A railway freight car comprising:
a car body bolster structure,
a truck bolster supporting the car body bolster and having a truck center bearing bowl having an upwardly facing generally horizontal bearing surface,
said car body bolster structure comprising a car body center plate carried upon the truck bowl including a car body base member supporting the body bolster, said base member having a laterally outward portion having a depending undersurface and a central annular flange portion extending below the outward portion toward the area of the truck bowl,
an annular wear member vertically aligned beneath said base member, said annular wear member having a top surface and a bottom truck bowl bearing surface for mating with the bowl to permit relative pivotal movement between said wear plate and said truck bowl while preventing lateral movement of said truck bowl relative to said wear plate; and
an annular elastomeric cushion disc vertically aligned between said base and wear members and having an upper surface bonded to said undersurface of the base member and a bottom surface bonded to the upper surface of the wear member and being disposed about the periphery of said annular flange portion; whereby,
vertically directed forces on said truck bowl and improved body center plate during rail operations are substantially dissipated by substantially vertical reactive compression of said elastomeric disc between said vertically spaced base and wear members and swiveling movement of the truck caused by truck hunting is minimized.

9. The invention according to claim 8, and
said annular wear member including an upstanding peripheral flange portion having an upper surface vertically spaced a predetermined distance from said base member and abutably engageable thereagainst.

10. The invention according to claim 8, and
said annular wear member having an apertured portion receiving said annular flange portion,
said apertured portion having an aperture receiving the flange portion of greater diameter than said flange portion, to accommodate limited shifting movement of said annular flange portion therewithin.

* * * * *